US012600127B2

(12) United States Patent
Zhang et al.

(10) Patent No.: US 12,600,127 B2
(45) **Date of Patent: *Apr. 14, 2026**

(54) INKJET ASSEMBLY, INKJET PRINTING APPARATUS AND INKJET PRINTING METHOD FOR USE IN PREPARATION OF DISPLAY COMPONENT

(71) Applicants: BOE TECHNOLOGY GROUP CO., LTD., Beijing (CN); Shanghai University, Shanghai (CN)

(72) Inventors: Jinsong Zhang, Beijing (CN); Jin Cao, Beijing (CN); Zhiliang Wang, Beijing (CN); Limin Yan, Beijing (CN); Xinguo Li, Beijing (CN); Xiao Wu, Beijing (CN)

(73) Assignees: BOE TECHNOLOGY GROUP CO., LTD., Beijing (CN); Shanghai University, Shanghai (CN)

( * ) Notice: Subject to any disclaimer, the term of this patent is extended or adjusted under 35 U.S.C. 154(b) by 22 days.

This patent is subject to a terminal disclaimer.

(21) Appl. No.: 18/454,925

(22) Filed: Aug. 24, 2023

(65) Prior Publication Data

US 2023/0391077 A1 Dec. 7, 2023

Related U.S. Application Data

(62) Division of application No. 17/484,152, filed on Sep. 24, 2021, now Pat. No. 11,794,471.

(30) Foreign Application Priority Data

Dec. 11, 2020 (CN) ........................ 202011459662.7

(51) Int. Cl.
*B41J 2/07* (2006.01)
*B41J 2/03* (2006.01)
(Continued)

(52) U.S. Cl.
CPC . *B41J 2/07* (2013.01); *B41J 2/03* (2013.01); *B41J 2/1721* (2013.01); *B41J 2/17596* (2013.01)

(58) Field of Classification Search
None
See application file for complete search history.

(56) References Cited

U.S. PATENT DOCUMENTS 3,673,601 A * 6/1972 Hertz ..................... H04N 1/034 347/73
6,290,348 B1 9/2001 Becker et al.
(Continued)

FOREIGN PATENT DOCUMENTS

CN 1151941 A 6/1997
CN 1414910 A 4/2003
(Continued)

OTHER PUBLICATIONS

China Patent Office, First Office Action dated Jun. 7, 2021, for corresponding Chinese application No. 202011459662.7.
(Continued)

*Primary Examiner* — Alejandro Valencia
(74) *Attorney, Agent, or Firm* — HOUTTEMAN LAW LLC

(57) ABSTRACT

The present disclosure relates to the field of display technology, and provides an inkjet assembly, an inkjet printing apparatus and an inkjet printing method. The inkjet assembly includes at least one jet printing member having a first surface on which an inkjet port is formed. The inkjet assembly further includes a deflection member configured to provide a deflection force to a fluid emitted from the inkjet port and a control member configured to control operation of the deflection member.

6 Claims, 6 Drawing Sheets

(51) Int. Cl.
*B41J 2/17* (2006.01)
*B41J 2/175* (2006.01)

(56) References Cited

U.S. PATENT DOCUMENTS

| | | | | |
|---|---|---|---|---|
| 6,520,402 | B2 * | 2/2003 | Orme-Marmerelis | B22F 1/065 228/33 |
| 6,851,796 | B2 * | 2/2005 | Jeanmaire | B41J 2/09 347/90 |
| 8,651,632 | B2 | 2/2014 | Marcus et al. | |
| 10,011,119 | B2 * | 7/2018 | Michallon | B41J 2/185 |
| 2002/0015069 | A1 | 2/2002 | Dromard | |
| 2005/0122381 | A1 * | 6/2005 | Golombat | B41J 2/09 347/77 |
| 2006/0197809 | A1 | 9/2006 | Tobita et al. | |
| 2010/0315471 | A1 | 12/2010 | Kihira | |
| 2018/0170040 | A1 | 6/2018 | Desideri | |
| 2022/0184945 | A1 * | 6/2022 | Zhang | B41J 2/1721 |

FOREIGN PATENT DOCUMENTS

| | | | |
|---|---|---|---|
| CN | 1827375 | A | 9/2006 |
| CN | 107060088 | A | 8/2017 |
| CN | 108205069 | A | 6/2018 |
| CN | 110587884 | A | 12/2019 |
| KR | 20100112443 | A | 10/2010 |

OTHER PUBLICATIONS

USPTO, Notice of Allowance issued on Jun. 30, 2023 regarding the U.S. Appl. No. 17/484,152.

USPTO, Restriction Requirement issued on Oct. 12, 2022 regarding the U.S. Appl. No. 17/484,152.

USPTO, Office action issued on Dec. 23, 2022 regarding the U.S. Appl. No. 17/484,152.

USPTO, final Office action issued on Apr. 3, 2023 regarding the U.S. Appl. No. 17/484,152.

* cited by examiner

INKJET ASSEMBLY, INKJET PRINTING APPARATUS AND INKJET PRINTING METHOD FOR USE IN PREPARATION OF DISPLAY COMPONENT

CROSS-REFERENCE TO RELATED APPLICATION

The present application is a divisional application of U.S. application Ser. No. 17/484,152, filed Sep. 24, 2021, which claims benefit of and priority to Chinese patent application No. 202011459662.7 filed with China National Intellectual Property Administration (CNIPA) on Dec. 11, 2020, the entirety of each of which is hereby incorporated herein by reference.

TECHNICAL FIELD

The present disclosure relates to the technical field of display devices, and particularly relates to an inkjet assembly, an inkjet printing apparatus and an inkjet printing method for use in preparation of a display component.

BACKGROUND

In the prior art, inkjet printing is used in preparation of a light-emitting layer, a display layer and the like of a display component. The inkjet printing of a display component typically needs to meet three technical requirements: high precision, high efficiency, and high speed. Specifically, high precision requires volumes of ink droplets deposited in each display element (pixel) remaining highly consistent; high efficiency requires the capability of printing a large area of pixels simultaneously with multiple nozzles; and high speed requires fast start and stop of the jet printing process, i.e., instantaneous response of the jet printing action, in response to high speed movements and translation of the display component. Inkjet printing a display component with a solution method shows the development direction of the next generation of display component printing. In the solution method, a fluid is taken as the printing material for preparation of the light-emitting layer and the display layer of the display component. The fluid used therein may be an organic or inorganic solution. Between pixel cells of the display component, there are banks. When the display component is inkjet printed using the solution method, since the fluid generally has the characteristics of large inertia and low response speed, the fluid will fall onto the banks and then flow into the pixel cells near the banks if the start and stop of the jet printing process is not performed timely enough, which may affect the yield of the display component.

Therefore, the existing inkjet printing apparatus using the solution method cannot meet the high-speed requirement of inkjet printing for a display component.

SUMMARY

Technical solutions of the embodiments of the present disclosure relate to an inkjet assembly for use in an inkjet printing apparatus. The inkjet assembly includes at least one jet printing member having a first surface on which an inkjet port is formed.

The inkjet assembly further includes a deflection member configured to provide a deflection force to a fluid emitted from the inkjet port and a control member configured to control operation of the deflection member.

Optionally, the deflection member includes at least one first electrode and at least one second electrode; and

- the at least one first electrode is disposed opposite to the at least one second electrode, and the inkjet port is formed between the first electrode and the second electrode oppositely disposed.

Optionally, the jet printing member includes a nozzle plate on which the first surface and the inkjet port are formed, the inkjet port runs through the nozzle plate along a thickness direction of the nozzle plate, and the first electrode and the second electrode are provided on the first surface.

Optionally, the inkjet port includes a plurality of sub inkjet ports, a space is provided between any two adjacent sub inkjet ports, the plurality of sub inkjet ports are arranged in at least one row, and a length direction of the first electrode and a length direction of the second electrode are both in line with a row direction of the plurality of sub inkjet ports.

Optionally, the plurality of sub inkjet ports are arranged in two rows; and

- the deflection member includes one first electrode and two second electrodes, with the first electrode arranged in a space between the two rows of sub inkjet ports, and with the two second electrodes arranged on two sides of the two rows of sub inkjet ports opposite to the first electrode side, so that a row of sub inkjet ports are arranged in a space between each of the two second electrodes and the first electrode.

Optionally, the inkjet assembly further includes an inkjet fluid guide layer having fluid guide channels formed in the inkjet fluid guide layer;

- the fluid guide channels include at least one first-phase channel, at least one second-phase channel, and at least one mixed-phase channel;
- the first-phase channel and the second-phase channel are independent of each other, and in communication with the at least one mixed-phase channel, respectively; and
- the mixed-phase channel is in communication with the sub inkjet ports.

Optionally, a surface of the nozzle plate facing away from the first surface is a second surface;

- the inkjet fluid guide layer includes a first guide plate and a second guide plate, each of the first guide plate and the second guide plate is disposed in stack with the nozzle plate and provided on the second surface of the nozzle plate, and the first guide plate and the second guide plate has a first-phase channel and a mixed-phase channel formed thereon;
- the first guide plate includes a third surface facing the second surface and a fourth surface facing away from the second surface, wherein a groove used as the first-phase channel on the first guide plate is formed on the fourth surface, a groove used as the mixed-phase channel on the first guide plate is formed on the third surface, and a first guide hole running through the first guide plate along a thickness direction is formed on a bottom wall of the first-phase channel on the first guide plate, so that the first-phase channel on the first guide plate is in communication with the mixed-phase channel on the first guide plate;
- the second guide plate includes a fifth surface facing the second surface and a sixth surface facing away from the second surface, wherein a groove used as the first-phase channel on the second guide plate is formed on the sixth surface, a groove used as the mixed-phase channel on the second guide plate is formed on the fifth surface, and a second guide hole running through the second guide plate along a thickness direction is formed on a bottom wall of the first-phase channel on the second guide plate, so that the first-phase channel on the second guide plate is in communication with the mixed-phase channel on the second guide plate; and a space between the first guide plate and the second guide plate along the row direction of the sub inkjet ports forms the second-phase channel that is in communication with the mixed-phase channel formed on the first guide plate and the mixed-phase channel formed on the second guide plate.

Optionally, the second-phase channel is in communication with the mixed-phase channel on the first guide plate via a third guide hole formed in the first guide plate, and in communication with the mixed-phase channel on the second guide plate via a fourth guide hole formed on the second guide plate, respectively, wherein an axial direction of the third guide hole intersects an axial direction of the first guide hole, and an axial direction of the fourth guide hole intersects an axial direction of the second guide hole.

Optionally, a first backflow plug is formed in the third guide hole, the first backflow plug is located at an end of the third guide hole close to the second-phase channel, and a gap is provided between a side surface of the first backflow plug and a wall of the third guide hole; and a second backflow plug is formed in the fourth guide hole, the second backflow plug is located at an end of the fourth guide hole close to the second-phase channel, and a gap is provided between a side surface of the second backflow plug and a wall of the fourth guide hole.

Optionally, the third guide hole has an aperture that gradually decreases from the end of the third guide hole close to the second-phase channel to an end of the third guide hole away from the second-phase channel, and the fourth guide hole has an aperture that gradually decreases from the end of the fourth guide hole close to the second-phase channel to an end of the fourth guide hole away from the second-phase channel.

The present disclosure further provides an inkjet printing apparatus, including an inkjet assembly and an ink cartridge configured to provide a jet printing fluid to the inkjet assembly, the inkjet assembly being the inkjet assembly as described above.

Optionally, the inkjet printing apparatus further includes a waste collection device provided on the ink cartridge and located on a side of the inkjet port.

Optionally, the waste collection device includes a waste tank casing detachably connected to the ink cartridge, and a waste absorbent placed in the waste tank casing, a side of the waste tank casing facing the inkjet port being open.

Optionally, a seventh surface is provided on an outer side the ink cartridge, the inkjet assembly is provided on the seventh surface, and the seventh surface is further provided with a first protrusion protruding toward the outer side of the ink cartridge; and the waste tank casing includes a tank body part configured to contain the waste absorbent, and a second protrusion protruding from the tank body part toward a direction close to a cartridge body and lapped with the first protrusion.

Optionally, the ink cartridge includes a cartridge body and first and second ink reservoirs formed within the cartridge body, wherein the cartridge body has a seventh surface and an eighth surface facing away from the seventh surface, the first ink reservoir and the second ink reservoir are independent of each other, the first ink reservoir is in communication with the first-phase channel, and the second ink reservoir is in communication with the second-phase channel; and the eighth surface is provided with a first inflow channel and a first pressure holding channel which are in communication with the first ink reservoir, and a second inflow channel and a second pressure holding channel which are in communication with the second ink reservoir.

The present disclosure further provides an inkjet printing method for use in preparation of a display component, which performs inkjet printing using the inkjet printing apparatus as described above, wherein the method includes the steps of:

sending by the controller a starting instruction to a fluid source, after receiving the starting instruction, the fluid source introduces a fluid into the ink cartridge so that the inkjet port emits a jet printing liquid of the fluid;

moving the jet printing liquid of the fluid into pixel cells of a substrate along a vertical direction, where the fluid is deposited in the pixel cells of the substrate to perform pixel cell printing;

controlling, after printing of a current pixel cell is finished, by the controller through the control member, to enable the deflection member, so that the jet printing liquid is deflected, and no jet printing liquid is deposited in an area below the inkjet assembly; and controlling, when a next pixel cell to be jet printed is moved to a position below the inkjet assembly, by the controller through the control member, to disable the deflection member, so as to continue the pixel cell printing.

Optionally, the inkjet printing apparatus further includes a micro pump, and wherein the inkjet printing method further includes the steps of:

sending, by the controller, a starting instruction to the micro pump;

starting the micro pump to receive regulation parameters sent from the controller to control a flow rate and a flow velocity of the fluid, so that the inkjet port emits a jet printing liquid of the fluid of a specified size at a specified frequency; and controlling, by the controller, the micro pump to continuously emit the jet printing liquid of the specified size at the specified frequency.

Optionally, the inkjet printing apparatus further includes a pressure holding device, and wherein the inkjet printing method further includes the steps of:

sending, by the controller, a starting instruction to the pressure holding device so that the pressure holding device adjusts a pressure of the fluid precisely.

Optionally, the inkjet printing apparatus further includes a waste collection device, and wherein the inkjet printing method further includes the steps of:

controlling, after printing of a current pixel cell is finished, by the controller through the control member, to enable the deflection member, so that the jet printing droplets are deflected to enter the waste collection device placed horizontally and be stored in the waste collection device.

The present disclosure further provides an inkjet printing method for use in preparation of a display component, which performs inkjet printing using the inkjet printing apparatus as described above, wherein the inkjet printing apparatus further includes a micro pump, and wherein the method includes the steps of:

sending by the controller a starting instruction to a fluid source and the micro pump, supplying, after receiving the starting instruction, by the fluid source, the first ink reservoir of the ink cartridge with a first-phase fluid and the second ink reservoir with a second-phase fluid;

starting the micro pump to receive regulation parameters sent from the controller to control flow rates and velocities of the first-phase fluid and the second-phase fluid, so that the inkjet port emits jet printing droplets of a specified size at a specified frequency in which the first-phase fluid encases the second-phase fluid;

controlling, by the controller, the micro pump to continuously emit the jet printing droplets of the specified size at the specified frequency;

moving the jet printing droplets along a vertical direction into pixel cells of a substrate, where the first-phase fluid is volatilized and the second-phase fluid is deposited in the pixel cells of the substrate, so as to perform pixel cell printing;

controlling, after printing of a current pixel cell is finished, by the controller through the control member, to enable the deflection member, so that the jet printing droplets are deflected, and no jet printing droplet is deposited in an area below the inkjet assembly; and controlling, when a next pixel cell to be jet printed is moved to a position below the inkjet assembly, by the controller through the control member, to disable the deflection member, so as to continue the pixel cell printing.

DETAILED DESCRIPTION

Figure 1:
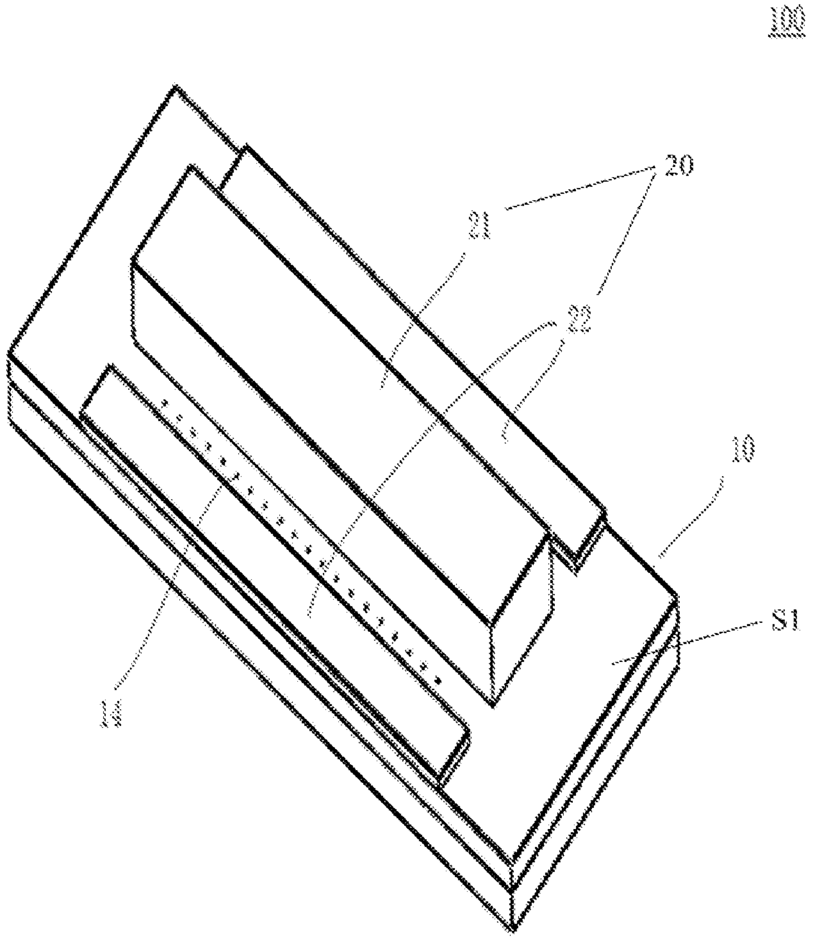
FIG. 1 is a 3D structural view of an inkjet assembly provided in an embodiment of the present disclosure.

The present disclosure will now be described in detail below, and examples of embodiments of the present application will be shown in the drawings throughout which, the same or similar reference signs refer to the same or similar components or components with the same or similar functions. In addition, a detailed description of the known art is omitted if it is unnecessary for the shown features of the present disclosure. The embodiments described below with reference to the drawings are merely illustrative, and are used only for the purpose of explaining the disclosure and should not be interpreted as limitations to the disclosure.

It will be understood by those skilled in the art that, unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the prior art and will not be interpreted in an idealized or overly formal sense unless expressly so defined herein.

Those skilled in the art will understand that as used herein, the singular forms “a”, “an”, “the” and “said” are intended to include the plural forms as well, unless expressly stated otherwise. It will be understood that when an element is referred to as being “connected” or “coupled” to another element, it can be directly connected or coupled to the other element or intervening elements may also be present. Further, “connected” or “coupled” as used herein may include wirelessly connected or wirelessly coupled. As used herein, the term “and/or” includes all or any element and all combinations of one or more of the associated listed items.

The following describes the technical solution of the disclosure and how to solve the above technical problems in detail in conjunction with the accompany drawings and specific embodiments.

In an embodiment of the present disclosure, there is provided an inkjet assembly 100 applicable to an inkjet printing apparatus. The inkjet assembly 100 can be used in preparation of a display component, particularly a light-emitting layer or a display layer in the display component. The inkjet printing apparatus using the inkjet assembly 100 can realize real-time dynamic shutdown during the inkjet printing process, and thus suspension of the jet printing between different pixel cells of the substrate of the display component, so that the inkjet printing process of the display component can be completed at a high speed.

Figure 2:
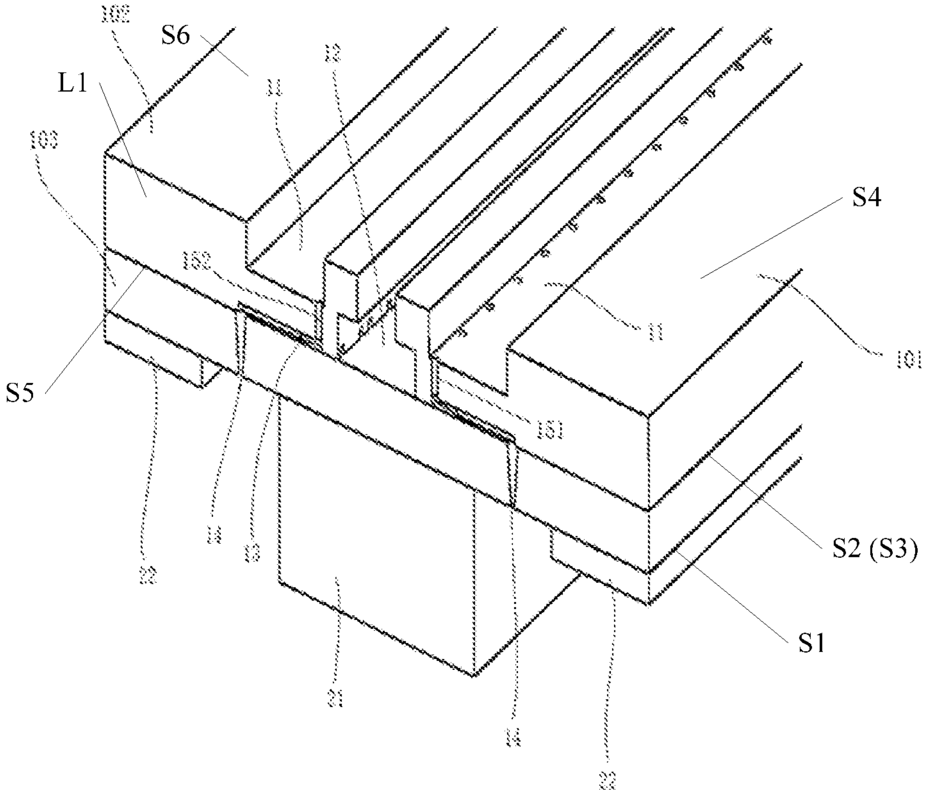
FIG. 2 is a partial structural view of an inkjet assembly provided in an embodiment of the present disclosure.

As shown in FIGS. 1 and 2, the inkjet assembly 100 may include at least one jet printing member 10 having a first surface S1 on which an inkjet port 14 is formed. The inkjet assembly 100 may further include a deflection member 20 that may be configured to provide a deflection force to a fluid emitted from the inkjet port 14. The inkjet assembly further includes a control member configured to control operation of the deflection member 20. In some embodiments, the control member may be integrated in the deflection member 20, which is not limited here.

In the present disclosure, the first surface S1 may be understood as a surface of the inkjet assembly 100 facing a member to be printed (e.g., a substrate 400, including pixel cells to be inkjet printed). The fluid emitted from the inkjet port may include an inkjet printing ink, and may further include some volatile or diffusible liquids.

The inkjet assembly 100 provided in the embodiment of the present disclosure may set the deflection member via the control member to provide a deflection force to the fluid emitted through the inkjet port 14 of the jet printing member 10, so as to rapidly change a moving direction of the fluid. When the inkjet printing of one pixel cell is completed, the inkjet port 14 is moved at a relatively high speed between different pixel cells. During the high-speed movement, the deflection member 20 may deflect the fluid emitted from the inkjet port so that the fluid will not be deposited on a bank between different pixel cells. When a next pixel cell to be jet printed is moved to right below the inkjet assembly 100, the fluid emitted from the inkjet port is not deflected, but deposited in the current pixel cell to complete the pixel cell printing. Therefore, the embodiment of the disclosure realizes real-time dynamic shutdown of the inkjet printing process, and thus suspension of the inkjet printing process between different pixel cells in the substrate of the display component, so that the inkjet printing process of the display component can be completed at a high speed.

In an embodiment of the present disclosure, the deflection member 20 may include deflection electrodes. Accordingly, the deflection electrodes may be at least one first electrode 21 and at least one second electrode 22. The at least one first electrode 21 is disposed opposite to the at least one second electrode 22. The inkjet port 14 is formed between the first electrode 21 and the second electrode 22 oppositely disposed. The first electrode 21 may be a positive electrode or negative electrode, and the second electrode 22 may be a negative electrode or positive electrode having an opposite polarity to the first electrode 21. In other words, it will work as long as the polarities of the first electrode 21 and the second electrode 22 are opposite. In this manner, an electric field may be generated between the two electrodes by providing the first electrode 21 and the second electrode 22 with opposite polarities. Under the action of the electric field, the fluid with a charge emitted from the inkjet port 14 may be deflected (the fluid for inkjet printing typically has a certain charge) so that the real-time dynamic shutdown of the inkjet printing process is realized through the electromagnetic fast response.

As shown in FIG. 2, the jet printing member 10 may include a nozzle plate 103. The above-described first surface S1 may be formed on the nozzle plate 103. The inkjet port 14 may be formed on the nozzle plate 103, and run through the nozzle plate 103 along a thickness direction of the nozzle plate 103. The first electrode 21 and the second electrode 22 may be both provided on the first surface S1. The inkjet port 14 may have a convergent caliber. In other words, the thickness direction of the nozzle plate 103 gradually decreases from an inlet away from the first surface S1 to an outlet on the first surface S1. Preferably, the inkjet port 14 may be a reverse tapered inkjet port. The convergent inkjet port not only facilitates the fluid flowing from the inlet of the inkjet port into the inkjet port, but also increases the velocity and pressure at which the jet printing droplets are emitted.

It should be noted that the thickness of the nozzle plate 103 is a length of the nozzle plate 103 along a direction perpendicular to the first surface; the term "thickness" below also has a similar meaning, which is not repeated here. In some embodiments, the first surface S1 may be provided as a surface in a horizontal direction. Accordingly, the thickness direction may be a vertical direction.

To improve the inkjet efficiency and effect, the inkjet port 14 may include a plurality of sub inkjet ports 14*a*. The plurality of sub inkjet ports 14*a* may be configured as inkjet ports of a smaller diameter, so as to increase an inkjet area and uniformity of the inkjet ports, thereby improving the inkjet effect and better facilitating completion of the pixel cell printing. A space may be provided between any two adjacent sub inkjet ports 14*a* to prevent repeated ink jetting, which may waste the inkjet fluid and affect the inkjet effect. The plurality of sub inkjet ports 14*a* may be arranged in at least one row. A length direction of the first electrode 21 and a length direction of the second electrode 22 are both in line with a row direction of the plurality of sub inkjet ports 14*a*, so as to facilitate provision of the deflection electrodes.

In the row direction of the plurality of sub inkjet ports 14*a*, each of the first electrode 21 and the second electrode 22 may have a length greater than or equal to a total length of one row of sub inkjet ports 14*a* between the first electrode 21 and the second electrode 22. Thereby, the electric field formed by the first electrode 21 and the second electrode 22 has a deflection force on each row of sub inkjet ports 14*a*, thereby ensuring that all the fluid emitted from the sub inkjet ports 14*a* are deflected under an action of the first electrode 21 and the second electrode 22. The total length of a row of sub inkjet ports 14*a* refers to a distance between the sub inkjet ports at opposite ends of the row. The row direction of the plurality of sub inkjet ports 14*a* may be, but is not limited to, a length direction of the first surface.

Optionally, the plurality of sub inkjet ports 14*a* may be arranged in two rows. The deflection electrodes of deflection member 20 may be one first electrode 21 and two second electrodes 22. The first electrode 21 is arranged in a space between the two rows of sub inkjet ports 14*a*, while the two second electrodes 22 are arranged on two sides of the two rows of sub inkjet ports 14*a* opposite to the first electrode 21 side. A row of sub inkjet ports 14*a* are arranged in a space between each of the two second electrodes 22 and the first electrode 21. With this arrangement, only one first electrode 21 and two second electrodes 22 are needed to provide the deflection force for the two rows of sub inkjet ports 14*a*. Compared with the arrangement of one first electrode 21 corresponding to one second electrode 22, this arrangement can reduce one first electrode 21, and thus improve the integration of the whole structure. In some embodiments, this arrangement further facilitates provision of a waste collection device 500 (described in detail below) on an outer side of the electrodes to collect the deflected fluid.

Optionally, as shown in FIG. 1, the first electrode 21 in the middle may be set to have a thickness greater than the second electrodes 22 at two sides, so as to enhance the electric field intensity between the first electrode 21 and the second electrodes 22, and further ensure the deflection effect of the fluid. In some embodiments, such a thickness arrangement further facilitates provision of the waste collection device 500 on a bottom or outer side of the second electrodes 22. In some embodiments, the control member may be disposed on the first electrode 21.

It should be noted that the structure of the deflection member 20 as described above is merely one of the specific embodiments provided by the present disclosure, and the present disclosure is not limited thereto, as long as the deflection member 20 can achieve the function of: providing a deflection force for a fluid emitted from the inkjet port 14.

In another embodiment provided by the present disclosure, the inkjet assembly may further include an inkjet fluid guide layer L1 having fluid guide channels 11X formed therein. The fluid guide channels 11X may include at least one first-phase channel 11, at least one second-phase channel 12, and at least one mixed-phase channel 13. The first-phase channel 11 and the second-phase channel 12 are independent of each other. There is no fluid communication between the first-phase channel 11 and the second-phase channel 12. The first-phase channel 11 is in communication with the at least one mixed-phase channel 13, and the second-phase channel 12 is in communication with the at least one mixed-phase channel 13. The mixed-phase channel 13 is in communication with the sub inkjet ports 14*a*. In this way, two fluids of different phases which are not mutually fused may be introduced into the first-phase channel 11 and the second-phase channel 12, respectively, then mixed in the mixed-phase channel 13, and emitted from the inkjet port 14 to form continuous droplets. The fluid introduced into the first-phase channel 11 is referred to as a first-phase fluid, and the fluid introduced into the second-phase channel 12 is referred to as a second-phase fluid. In some embodiments, the first-phase fluid introduced into the first-phase channel 11 is a continuous-phase fluid, and the second-phase fluid introduced into the second-phase channel 12 is a dispersed-phase fluid. In this embodiment, after being mixed in the mixed-phase channel 13, one of the continuous-phase fluid and the dispersed-phase fluid has a shearing action on the other, so that stable jet printing droplets in which the continuous-phase fluid encases the dispersed-phase fluid may be formed. In some embodiments, the continuous-phase fluid in the first-phase channel 11 is a volatile solvent, and the dispersed-phase fluid in the second-phase channel 12 is a jet printing ink. In some embodiments, an inner diameter of the mixed-phase channel 13 and flow rates and velocities of the fluids may be set to obtain jet printing droplets of a specified size and better size uniformity, which may be controlled to be emitted at a specified frequency to further meet the high precision requirement of the inkjet printing process.

In some embodiments, the mixed-phase channel 13 may be a micro channel of less than 1 mm, so as to obtain the stable jet printing droplets in which the continuous-phase fluid encases the dispersed-phase fluid. Accordingly, each of the sub inkjet ports 14*a* may have a caliber less than 1 mm.

Figure 3:
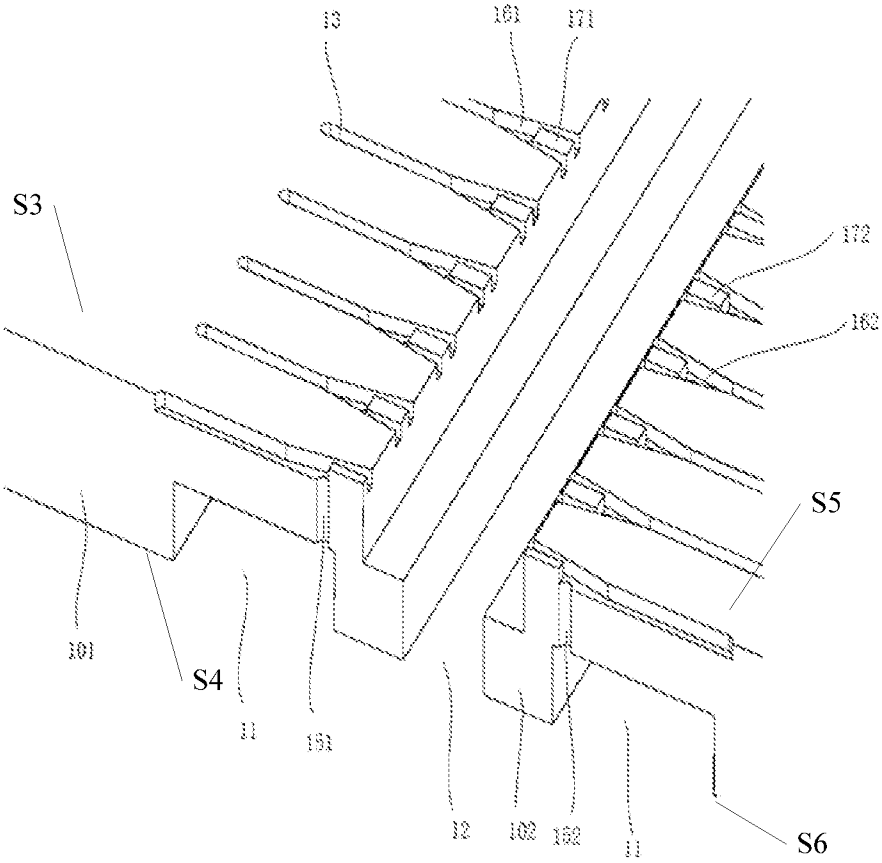
FIG. 3 is a partial structural view of an inkjet assembly provided in an embodiment of the present disclosure, in which the inkjet assembly is inverted.

In some embodiments, as shown in FIGS. 1 to 3, a surface of the nozzle plate 103 facing away from the first surface S1 is a second surface S2. The inkjet fluid guide layer L1 may include a first guide plate 101 and a second guide plate 102. Each of the first guide plate 101 and the second guide plate 102 may be disposed in a stack with the nozzle plate 103, and disposed on the second surface S2 of the nozzle plate 103. Each of the first guide plate 101 and the second guide plate 102 is provided with the first-phase channel 11 and the mixed-phase channel 13.

The first guide plate 101 may include a third surface S3 facing the second surface S2 and a fourth surface S4 facing away from the second surface. A groove used as the first-phase channel 11 on the first guide plate 101 may be formed on the fourth surface S4. A groove used as the mixed-phase channel 13 on the first guide plate 101 may be formed on the third surface S3. A first guide hole 151 running through the first guide plate 101 along a thickness direction may be formed on a bottom wall of the first-phase channel 11 on the first guide plate 101, so that the first-phase channel 11 on the second guide plate 102 is in communication with the mixed-phase channel 13 on the second guide plate 102. In this manner, a groove is opened on each of the two surfaces (S3, S4) of the first guide plate 101 to form the arrangement of the first-phase channel 11 and the mixed-phase channel 13 on the first guide plate 101, so as to facilitate the process in which the first guide plate 101 is machined to form the fluid guide channels as described above.

The second guide plate 102 may be symmetrical in structure to the first guide plate 101 and thus may be referred to the design of the first guide plate 101. Specifically, the second guide plate 102 may include a fifth surface S5 facing the second surface and a sixth surface S6 facing away from the second surface. A groove used as the first-phase channel 11 on the second guide plate 102 may be formed on the sixth surface S6. A groove used as the mixed-phase channel 13 on the second guide plate 102 may be formed on the fifth surface S5. A second guide hole 152 running through the second guide plate 102 along a thickness direction may be formed on a bottom wall of the first-phase channel 11 on the second guide plate 102, so that the first-phase channel 11 on the second guide plate 102 is in communication with the mixed-phase channel 13 on the second guide plate 102. Similar to the design of the first guide plate 101, a groove is opened on each of the two surfaces (S5, S6) of the second guide plate 102 to form the arrangement of the first-phase channel 11 and the mixed-phase channel 13 on the second guide plate 102, so as to facilitate the process in which the second guide plate 102 is machined to form the fluid guide channels as described above.

In the row direction of the sub inkjet ports 14*a*, a space between the first guide plate 101 and the second guide plate

102 forms the second-phase channel 12. The second-phase channel 12 is in communication with the mixed-phase channel 13 formed on the first guide plate 101 and the mixed-phase channel 13 formed on the second guide plate 102.

As shown in FIG. 3 where the inkjet assembly is inverted, the first-phase channel 11 and the second-phase channel 12 may be both horizontally disposed and arranged along a length direction of the inkjet fluid guide layer. The mixed-phase channel 13 may be disposed horizontally below the first-phase channel 11 (the upper part of FIG. 3), and arranged along a width direction of the inkjet fluid guide layer (the direction perpendicular to the length direction of the inkjet fluid guide layer in the horizontal plane). The first guide hole 151 and the second guide hole 152 may be vertically disposed between the first-phase channel 11 and the mixed-phase channel 13.

The second-phase channel 12 may be in communication with the mixed-phase channel 13 on the first guide plate 101 via a third guide hole 161 formed in the first guide plate 101, and in communication with the mixed-phase channel 13 on the second guide plate 102 via a fourth guide hole 162 formed on the second guide plate 102, respectively. An axial direction of the third guide hole 161 intersects an axial direction of the first guide hole 151, and an axial direction of the fourth guide hole 162 intersects an axial direction of the second guide hole 152. The third guide hole 161 and the fourth guide hole 162 may be disposed horizontally so that the fluid in the second-phase channel 12 may flow into the corresponding mixed-phase channel 13 via the third guide hole 161 and the fourth guide hole 162. Specifically, the third guide hole 161 and the fourth guide hole 162 may be opened on a bottom of a sidewall of the second-phase channel 12 to facilitate lateral flow of the fluid. When the first guide hole 151 and the second guide hole 152 are vertically disposed, the axial direction of the third guide hole 161 may be perpendicular to the axial direction of the first guide hole 151, and the axial direction of the fourth guide hole 162 may be perpendicular to the axial direction of the second guide hole 152, so as to facilitate machining of the guide holes and make the fluid flow more smoothly.

An aperture of the third guide hole 161 may gradually decrease from an end of the hole close to the second-phase channel 12 to an end of the hole away from the second-phase channel 12. Likewise, an aperture of the fourth guide hole 162 may gradually decrease from an end of the hole close to the second-phase channel 12 to an end of the hole away from the second-phase channel 12. In other words, the third guide hole 161 and the fourth guide hole 162 may each have a convergent structure. In this manner, such an arrangement can facilitate the fluid in the second-phase channel 12 flowing into the mixed-phase channel 13, help to control the size and frequency of the jet printing droplets in the mixed-phase channel 13, and thus facilitate formation of stable jet printing droplets in which the continuous-phase fluid encases the dispersed-phase fluid.

Optionally, a first backflow plug 171 may be formed in the third guide hole 161, and the first backflow plug 171 may be located at an end of the third guide hole 161 close to the second-phase channel 12. A gap is provided between a side surface of the first backflow plug 171 and a wall of the third guide hole 161. Optionally, the first backflow plug 171 may be disposed at a position of a central axis of the third guide hole 161. Likewise, a second backflow plug 172 may be formed in the fourth guide hole 162, and the second backflow plug 172 may be located at an end of the fourth guide hole 162 close to the second-phase channel 12. A gap is provided between a side surface of the second backflow plug 172 and a wall of the fourth guide hole 162. Optionally, the second backflow plug 172 may be disposed at a position of a central axis of the fourth guide hole 162. By providing the backflow plugs (including the first backflow plug 171 and the second backflow plug 172), a cross-sectional area of an inlet end of the mixed-phase channel 13 is reduced, the flow velocity and pressure of the second-phase fluid in the second-phase channel 12 are increased, and the driving and shearing actions on the first-phase fluid by the second-phase fluid are ensured. After the first-phase fluid enters the mixed-phase channel 13, this arrangement may further prevent backflow of the first-phase fluid into the second-phase channel 12 due to a pressure difference generated by the convergent structures of the third guide hole 161 and the fourth guide hole 162, thereby facilitating generation and control of the ink droplets.

It should be noted that the structure of the inkjet fluid guide layer as described above is merely one of the specific embodiments of the present disclosure, and the present disclosure is not limited thereto. For example, the structures of the first guide plate 101 and the second guide plate 102 may be integrated into a single guide plate, and the second-phase channel 12 as described above may be opened on a surface of the integral guide plate. In addition, the fluid guide channel may be formed inside the inkjet fluid guide layer L1, as long as the function of forming the jet printing droplets in which one of the two phases of fluids encases the other, and guiding the droplets to the inkjet port can be achieved.

In addition, the materials and the processing manners of the nozzle plate 103 and the inkjet fluid guide layer L1 are not particularly limited in the present disclosure. For example, the inkjet fluid guide layer L1 may be made of an inorganic non-metal (e.g., silicon, glass) or an organic material (e.g., PMMA), while the nozzle plate 103 may be made of silicon. The material of the deflection electrode may be a metal material such as platinum, gold, silver, copper, or an alloy. Optionally, the micro structures (respective micro channels) of the inkjet fluid guide layer L1 and the nozzle plate 103 may be made through a semiconductor process. The deflection member 20 may be directly prepared on the nozzle plate 103, while the inkjet fluid guide layer L1 and the nozzle plate 103 may be bonded or adhered to each other to form a 3D two-phase flow micro channel structure.

Figure 4:
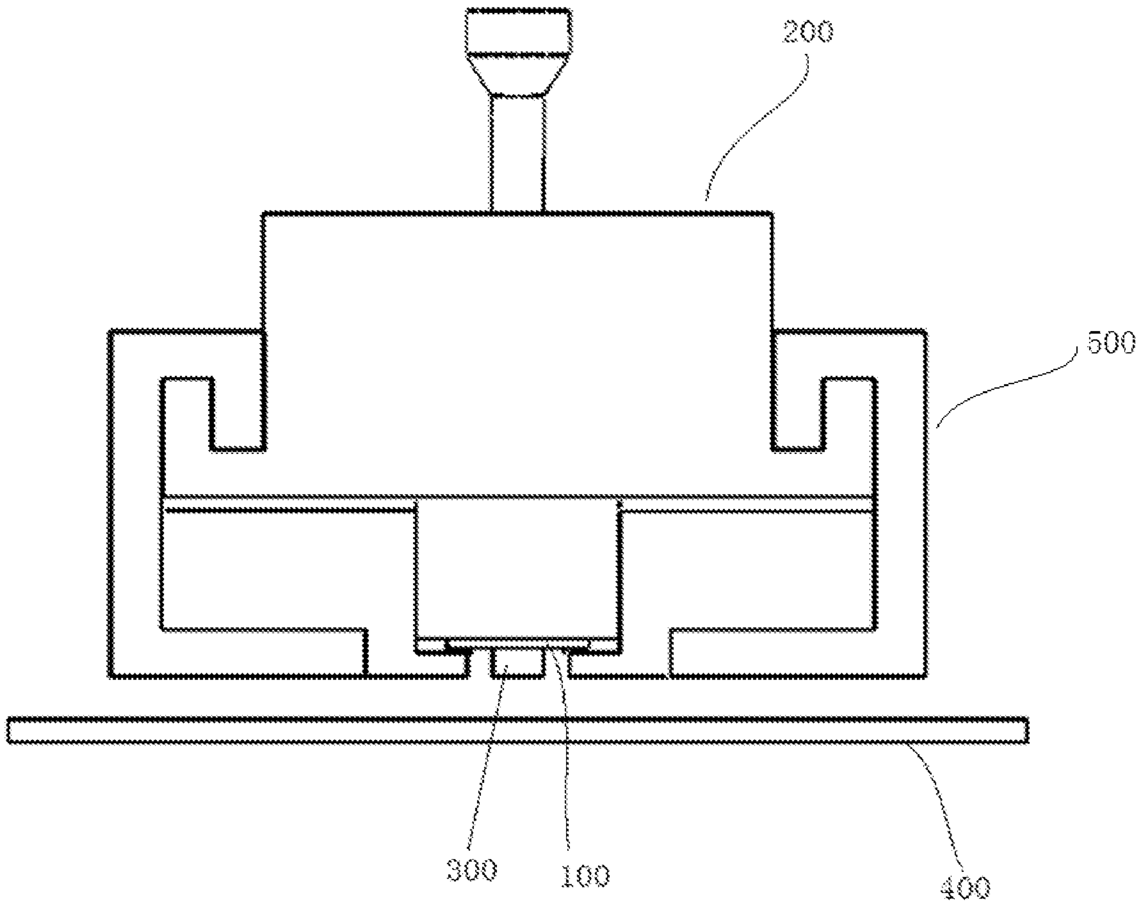
FIG. 4 is a front structural view of an inkjet printing apparatus provided in an embodiment of the disclosure.
Figure 5:
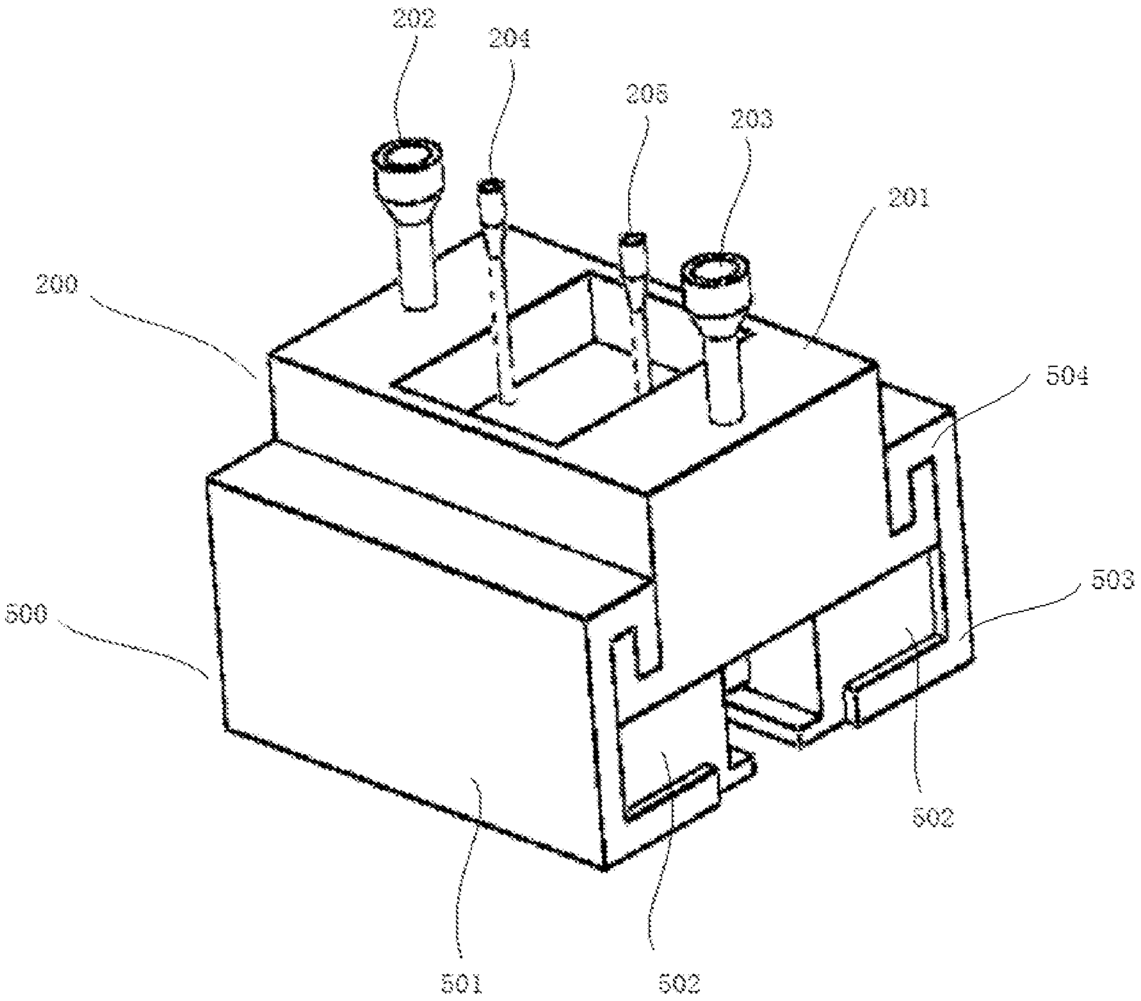
FIG. 5 is a 3D structural view of an inkjet printing apparatus provided in an embodiment of the disclosure.
Figure 6:
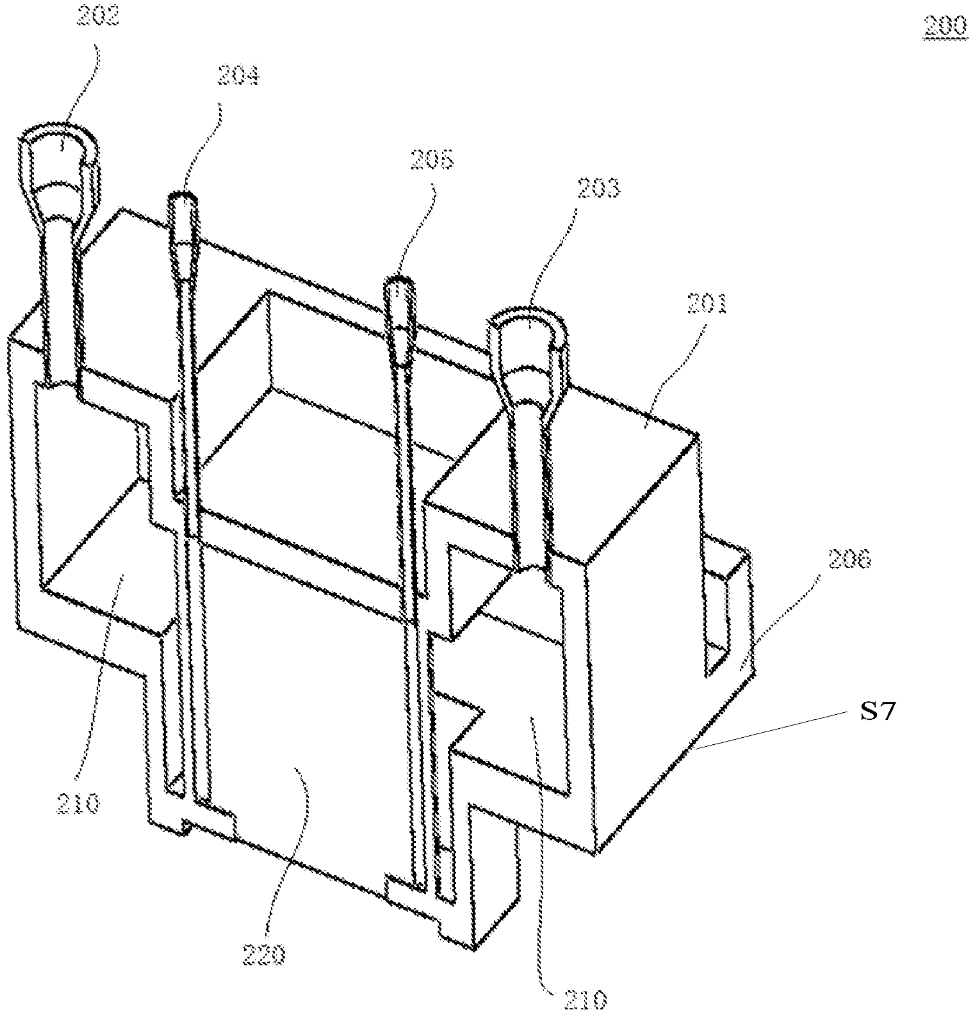
FIG. 6 is a sectional structural view of an ink cartridge provided in an embodiment of the disclosure.

Based on the same concept as the inkjet assembly 100, an embodiment further provides an inkjet printing apparatus. As shown in FIGS. 4 to 6, the inkjet printing apparatus may include an inkjet assembly 100 and an ink cartridge 200 configured to provide a jet printing fluid to the inkjet assembly 100. The inkjet assembly 100 is the inkjet assembly 100 according to any of the above implementations.

The inkjet printing apparatus provided in the embodiment includes the inkjet assembly 100 according to any of the above implementations, and can achieve at least beneficial effects that can be achieved by the inkjet assembly 100, which are not repeated here.

In this embodiment, as shown in FIGS. 4 to 6, the ink cartridge 200 has a seventh surface S7 on which the inkjet assembly 100 may be provided. Specifically, the ink cartridge 200 may include a cartridge body 201 and a first ink reservoir 210 and a second ink reservoir 220 provided in the cartridge body 201. The above-described seventh surface S7 may be formed on the cartridge body 201. The first ink reservoir 210 and the second ink reservoir 220 are isolated from each other. The first ink reservoir 210 is in communication with the first-phase channel 11 of the inkjet fluid guide layer L1 to store and supply the first-phase channel 11 with a first-phase fluid. The second ink reservoir 220 is in communication with the second-phase channel 12 of the inkjet fluid guide layer L1 to store and supply the second-phase channel 12 with a second-phase fluid. The cartridge body 201 is further provided with a first inflow channel 202 and a first pressure holding channel 203 which are in communication with the first ink reservoir 210, and a second inflow channel 204 and a second pressure holding channel 205 which are in communication with the second ink reservoir 220. The first pressure holding channel 203 and the second pressure holding channel 205 may be in communication with the pressure holding device (not shown), respectively. The first-phase channel 11 and the second-phase channel 12 may be in communication with the micro pump (not shown), respectively. When fluids are to be introduced into the inkjet assembly 100, the first-phase fluid may be introduced into the first inflow channel 202, and the second-phase fluid may be introduced into the second inflow channel 204. Pressures of the first-phase fluid and the second-phase fluid may be adjusted precisely via the pressure holding device. Then, the micro pump is activated to pump the first-phase fluid and the second-phase fluid to the inkjet assembly 100 for inkjet printing. It should be noted that the specific structure and material of the ink cartridge 200 are not particularly limited in the embodiment of the present disclosure, as long as it can supply the fluid for inkjet printing to the inkjet assembly 100. The embodiments of the present disclosure do not specifically limit the structures, materials and quantities of the pressure holding devices and the micro pumps. For example, one micro pump and one pressure holding device may be provided, or one micro pump and one pressure holding device may be provided for each of the first-phase channel 11 and the second-phase channel 12. In some embodiments, the ink cartridge 200 has an eighth surface S8 facing away from the seventh surface S7, on which a first inflow channel 202 and a first pressure holding channel 203 which are in communication with the first ink reservoir 210 are formed.

In a specific embodiment of the present disclosure, the inkjet printing apparatus further includes a waste collection device 500. The waste collection device 500 is provided on the ink cartridge 200 at the side of the inkjet port 14, and is configured to collect the deflected fluid emitted from the inkjet port. Thereby, the deflected fluid may be prevented from dropping on the member to be printed (such as a substrate) again under the action of gravity, and thus polluting the member to be jet printed.

Specifically, a waste collection device 500 may include a waste tank casing 501 and a waste absorbent 502. The waste tank casing 501 may be detachably connected to the ink cartridge 200. The waste absorbent 502 may be placed in the waste tank casing 501, and a side of the waste tank casing 501 facing the inkjet port 14 is open, so as to facilitate place and take of the waste absorbent 502. The waste absorbent 502 may be made of an elastomer with high adsorbability that can actively absorb and transport ink droplets deviating from a motion trajectory during the jet printing process by the capillary effect.

Optionally, the seventh surface S7 of the cartridge body 201 is provided with a first protrusion 206 protruding toward an outer side. The waste tank casing 501 may include a tank body part 503 and a second protrusion 504. The tank body part 503 is configured to accommodate the waste absorbent 502. The second protrusion 504 protrudes from the tank body part 503 toward a direction close to the cartridge body 201, and is lapped with the first protrusion 206 to realize detachable connection between the waste tank casing 501 and the cartridge body 201. When the waste tank casing 501 and the cartridge body 201 are connected, the tank body part 503 may be configured to secure the waste absorbent 502 (the waste absorbent 502 may be replaced regularly or irregularly to ensure the absorption function). More specifically, the first protrusion 206 may include a first lateral protrusion and a first vertical protrusion, the first vertical protrusion extending upward from a side of the first lateral protrusion close to the waste tank casing 501. The first vertical protrusion, the first lateral protrusion and an outer wall of the ink cartridge body 201 may form a U-shaped groove. The second protrusion 504 may include a second lateral protrusion and a second vertical protrusion, the second vertical protrusion extending downward from a side of the second lateral protrusion close to the cartridge body 201. The second lateral protrusion and the second vertical protrusion may form a lug structure to be hung and buckled in the U-shaped groove. Thus, a snap-fit engagement is formed between the waste tank casing 501 and the cartridge body 201, so as to facilitate attachment and detachment of the waste tank casing 501.

In a specific embodiment of the present disclosure, the inkjet printing apparatus further includes a controller 300. The controller 300 can be connected to a fluid source and the micro pump and the pressure holding device as describe above, respectively, so as to realize automatic printing with the inkjet printing apparatus. In some embodiments, the control member of the inkjet assembly 100 may be integrated into the controller 300.

In this embodiment, the controlling process of printing a display component with the inkjet printing apparatus may include: sending, by the controller 300, a starting instruction to the fluid source which, after receiving the starting instruction, introduces a fluid into the ink cartridge so that the inkjet port emits a jet printing liquid of the fluid; moving the jet printing liquid along a vertical direction into pixel cells of a substrate 400, where the fluid is deposited in the pixel cells of the substrate 400 to perform pixel cell printing; controlling, after printing of a current pixel cell is finished, by the controller 300 through the control member, to enable the deflection member 20, so that the jet printing liquid is deflected, and no jet printing liquid is deposited in an area right below the inkjet assembly 100; controlling, when a next pixel cell to be jet printed is moved to a position right below the inkjet assembly 100, by the controller 300 through the control member, to disable the deflection member 20, so as to continue the pixel cell printing. In this manner, real-time dynamic shutdown of the inkjet printing process, and thus suspension of the jet printing process between different pixel cells are realized, thereby completing the inkjet printing process of the display component.

In some embodiments, the controlling process of printing a display component with the inkjet printing apparatus may further include: sending, by the controller 300, a starting instruction to the micro pump; starting the micro pump to receive regulation parameters sent from the controller 300 to control a flow rate and a flow velocity of the fluid, so that the inkjet port emits a jet printing liquid of the fluid of a specified size at a specified frequency; controlling, by the controller 300, the micro pump to continuously emit the jet printing liquid of the specified size at the specified frequency, and moving the jet printing liquid along a vertical direction into pixel cells of a substrate 400, where the fluid is deposited in the pixel cells of the substrate 400 to perform pixel cell printing.

In some embodiments, the controlling process of printing a display component with the inkjet printing apparatus may further include: sending, by the controller 300, a starting instruction to the pressure holding device so that the pressure holding device adjusts a pressure of the fluid precisely.

In some embodiments, the controlling process of printing a display component with the inkjet printing apparatus may further include: sending, by the controller 300, a starting instruction to the fluid source, the micro pump, the pressure holding device and the like, the fluid source, after receiving the starting instruction, introduces the first ink reservoir 210 of the ink cartridge 200 with a first-phase fluid, and the second ink reservoir 220 with a second-phase fluid; and starting the micro pump to receive regulation parameters sent from the controller 300 to control flow rates and velocities of the first-phase fluid and the second-phase fluid, so that the inkjet port emits jet printing droplets of a specified size at a specified frequency in which the first-phase fluid encases the second-phase fluid. The controller 300 controls the micro pump to continuously emit the jet printing droplets of the specified size at the specified frequency, and the jet printing droplets are moved along a vertical direction into pixel cells of a substrate 400, where the first-phase fluid (or the second-phase fluid) is volatilized, and the second-phase fluid (or the first-phase fluid) is deposited in the pixel cells of the substrate 400 to perform pixel cell printing.

In some embodiments, after printing of a current pixel cell is finished, the controller 300 controls through the control member to enable the deflection member 20, so that the jet printing droplets are deflected to enter the waste collection device 500 (e.g., the waste absorbent 502) placed horizontally and be stored therein.

In some embodiments, the first-phase fluid and the second-phase fluid are not mutually fused and both of the two are volatilizable at a room temperature. One of the first-phase fluid and the second-phase fluid is a continuous-phase fluid and the other is a dispersed-phase fluid.

With the embodiments of the present disclosure, the three technical requirements of inkjet printing a display component can be satisfied, i.e., high precision, high efficiency, and high speed. Specifically, high precision requires volumes of ink droplets deposited in each display element (pixel) remaining highly consistent; high efficiency requires the capability of printing a large area of pixels simultaneously with multiple nozzles; and high speed requires fast start and stop of the jet printing process, i.e., instantaneous response of the jet printing action, in response to high speed movements and translation of the display component.

Those skilled in the art will understand that various operations, methods, steps in the flow, measures, solutions discussed in this disclosure can be alternated, modified, combined, or deleted.

It will be appreciated that in the description of the present disclosure, orientation or positional relationships referred by terms "central", "upper", "lower", "front", "back", "left", "right", "vertical", "horizontal", "top", "bottom", "inside", "outside" and the like are based on the orientation or positional relationship shown in the drawings, and are merely for facilitating description of the disclosure and simplifying the description, instead of indicting or implying that the device or component referred to must have a specific orientation or must be configured or operated at a specific orientation, and thus cannot be interpreted as limitations to the present disclosure.

The foregoing is merely part of the implementations of the present disclosure, and it should be noted that modifications and refinements may be made by those skilled in the art without departing from the principles of the disclosure and these modifications and refinements should be considered as within the scope of the disclosure.

What is claimed is:

1. An inkjet printing apparatus for use in preparation of a display component, comprising an inkjet assembly, an ink cartridge configured to provide a jet printing fluid to the inkjet assembly, and a controller configured to control the printing process, wherein the inkjet assembly comprising at least one jet printing member having a first surface on which an inkjet port structure is formed, the inkjet port structure comprises at least one sub inkjet port, wherein the inkjet assembly further comprises a deflection member configured to provide a deflection force to a fluid emitted from the inkjet port structure and a control member configured to control operation of the deflection member, wherein the inkjet printing apparatus further comprises a waste collection device provided on the ink cartridge and located on a side of the inkjet port structure, wherein the waste collection device comprises a waste tank casing detachably connected to the ink cartridge, and a waste absorbent placed in the waste tank casing, wherein one side of the waste tank casing facing the inkjet port structure is open, wherein the waste absorbent is provided on two sides around the inkjet port structure, wherein the deflection member comprises one first electrode and two second electrodes, wherein the first electrode is disposed opposite to each second electrode of the two second electrodes, and the inkjet port structure is formed between the first electrode and the each second electrode of the two second electrodes disposed opposite to the first electrode, wherein the first electrode has a thickness greater than the each second electrode of the two second electrodes, wherein a surface of the nozzle plate facing away from the first surface is a sec wherein the inkjet assembly further comprises an inkjet fluid guide layer having fluid guide channels formed in the inkjet fluid guide layer;

wherein the fluid guide channels comprise at least one first-phase channel, at least one second-phase channel, and at least one mixed-phase channel;

wherein the first-phase channel and the second-phase channel are independent of each other, and in communication with the at least one mixed-phase channel, respectively; and wherein the mixed-phase channel is in communication with the sub inkjet ports wherein a surface of the nozzle plate facing away from the first surface is a second surface;

wherein the inkjet fluid guide layer comprises a first guide plate and a second guide plate, each of the first guide plate and the second guide plate is disposed in stack with the nozzle plate and provided on the second surface of the nozzle plate, and each of the first guide plate and the second guide plate has a first-phase channel and a mixed-phase channel formed thereon;

wherein the first guide plate comprises a third surface facing the second surface and a fourth surface facing away from the second surface, wherein a groove used as the first-phase channel on the first guide plate is formed on the fourth surface, a groove used as the mixed-phase channel on the first guide plate is formed on the third surface, and a first guide hole running through the first guide plate along a thickness direction is formed on a bottom wall of the first-phase channel on the first guide plate, so that the first-phase channel on the first guide plate is in communication with the mixed-phase channel on the first guide plate;

wherein the second guide plate comprises a fifth surface facing the second surface and a sixth surface facing away from the second surface, wherein a groove used as the first-phase channel on the second guide plate is formed on the sixth surface, a groove used as the mixed-phase channel on the second guide plate is formed on the fifth surface, and a second guide hole running through the second guide plate along a thickness direction is formed on a bottom wall of the first-phase channel on the second guide plate, so that the first-phase channel on the second guide plate is in communication with the mixed-phase channel on the second guide plate; and wherein a space between the first guide plate and the second guide plate is formed along the row direction of the sub inkjet ports as the second-phase channel, and the second-phase channel is in communication with the mixed-phase channel formed on the first guide plate, and the second-phase channel is in communication with the mixed-phase channel formed on the second guide plate.

2. The inkjet printing apparatus according to claim 1, wherein a seventh surface is provided on a side of the ink cartridge facing the inkjet assembly, and a first protrusion is provided on a lateral side of the ink cartridge, and the first protrusion protrudes outwardly from the ink cartridge in a direction away from the seventh surface; and the waste tank casing comprises a tank body part configured to contain the waste absorbent, and a second protrusion protruding from the tank body part toward a direction close to a cartridge body and lapped with the first protrusion.

3. The inkjet printing apparatus according to claim 1, wherein the inkjet port structure comprises a plurality of sub inkjet ports the mixed-phase channel is in communication with the sub inkjet ports;

the ink cartridge comprises a cartridge body and first and second ink reservoirs formed within the cartridge body, wherein the cartridge body has a seventh surface and an eighth surface facing away from the seventh surface, the first ink reservoir and the second ink reservoir are independent of each other, the first ink reservoir is in communication with the first-phase channel, and the second ink reservoir is in communication with the second-phase channel; and the eighth surface is provided with a first inflow channel and a first pressure holding channel which are in communication with the first ink reservoir, and a second inflow channel and a second pressure holding channel which are in communication with the second ink reservoir.

4. The inkjet printing apparatus according to claim 1, wherein the jet printing member comprises a nozzle plate on which the first surface and the inkjet port structure are formed, the inkjet port structure runs through the nozzle plate along a thickness direction of the nozzle plate, and the first electrode and the second electrode are provided on the first surface.

5. The inkjet printing apparatus according to claim 4, wherein the inkjet port structure comprises a plurality of sub inkjet ports, a space is provided between any two adjacent sub inkjet ports, the plurality of sub inkjet ports are arranged in at least one row, and a length direction of the first electrode and a length direction of the second electrode are both in line with a row direction of the plurality of sub inkjet ports.

6. The inkjet printing apparatus according to claim 5, wherein the plurality of sub inkjet ports are arranged in two rows; and the first electrode arranged in a space between the two rows of sub inkjet ports, and with the two second electrodes arranged on two sides of the two rows of sub inkjet ports opposite to the first electrode, so that a row of sub inkjet ports are arranged in a space between each of the two second electrodes and the first electrode.

* * * * *